(12) United States Patent
Kugimiya et al.

(10) Patent No.: US 10,844,792 B2
(45) Date of Patent: Nov. 24, 2020

(54) DAMPING DEVICE, COMBUSTOR, AND GAS TURBINE

(71) Applicant: MITSUBISHI HEAVY INDUSTRIES, LTD., Tokyo (JP)

(72) Inventors: Wataru Kugimiya, Tokyo (JP); Keisuke Matsuyama, Tokyo (JP); Isao Taguchi, Tokyo (JP); Kiyoshi Fujimoto, Tokyo (JP)

(73) Assignee: MITSUBISHI HEAVY INDUSTRIES LTD., Tokyo (JP)

( * ) Notice: Subject to any disclaimer, the term of this patent is extended or adjusted under 35 U.S.C. 154(b) by 0 days.

(21) Appl. No.: 15/551,769

(22) PCT Filed: Feb. 23, 2015

(86) PCT No.: PCT/JP2015/055073
§ 371 (c)(1),
(2) Date: Aug. 17, 2017

(87) PCT Pub. No.: WO2016/135833
PCT Pub. Date: Sep. 1, 2016

(65) Prior Publication Data
US 2018/0038282 A1    Feb. 8, 2018

(51) Int. Cl.
*F02C 7/24* (2006.01)
*F23R 3/00* (2006.01)
(Continued)

(52) U.S. Cl.
CPC ............... *F02C 7/24* (2013.01); *F01D 25/00* (2013.01); *F01D 25/04* (2013.01); *F01D 25/26* (2013.01);
(Continued)

(58) Field of Classification Search
CPC .. F23R 2900/00014; F23R 3/46; F23R 3/002; F23M 20/005; F05D 2270/14;
(Continued)

(56) References Cited

U.S. PATENT DOCUMENTS

| 6,351,947 B1 * | 3/2002 | Keller | F23R 3/002 60/725 |
| 6,530,221 B1 * | 3/2003 | Sattinger | F01D 25/30 181/213 |

(Continued)

FOREIGN PATENT DOCUMENTS

| CN | 102165263 | 8/2011 |
| JP | 2006-266671 | 10/2006 |

(Continued)

OTHER PUBLICATIONS

International Search Report dated Apr. 7, 2015 in International (PCT) Application No. PCT/JP2015/055073.
(Continued)

*Primary Examiner* — William H Rodriguez
(74) *Attorney, Agent, or Firm* — Wenderoth, Lind & Ponack, L.L.P.

(57) ABSTRACT

To provide a damping device that includes an acoustic liner that forms an acoustic-liner resonant space along an outer periphery of a combustion chamber in which a combustion gas flows, and an acoustic damper provided on an outer peripheral side of the acoustic liner, to form an acoustic-damper resonant space that communicates with the acoustic-liner resonant space. The acoustic liner is formed with a damper opening connected with the acoustic damper for causing the acoustic-liner resonant space and the acoustic-damper resonant space to communicate with each other. The acoustic liner includes a divided portion that is a portion to be divided in a circumferential direction of the combustion chamber by the damper opening, and a continuous portion
(Continued)

that is a portion continuous over the circumferential direction of the combustion chamber.

8 Claims, 6 Drawing Sheets

(51) Int. Cl.
  *F01D 25/30* (2006.01)
  *F01D 25/00* (2006.01)
  *F01D 25/04* (2006.01)
  *F01D 25/26* (2006.01)
  *F23R 3/46* (2006.01)
(52) U.S. Cl.
  CPC .............. *F01D 25/30* (2013.01); *F23R 3/002* (2013.01); *F23R 3/46* (2013.01); *F05D 2240/35* (2013.01); *F05D 2260/96* (2013.01); *F05D 2260/963* (2013.01); *F05D 2260/964* (2013.01); *F23R 2900/00014* (2013.01)
(58) Field of Classification Search
  CPC ........... F05D 2260/96; F05D 2260/963; F05D 2260/964; F02C 7/24
  See application file for complete search history.

(56) References Cited

U.S. PATENT DOCUMENTS

| | | | | |
|---|---|---|---|---|
| 8,490,744 | B2* | 7/2013 | Nakamura | F01D 9/023 181/213 |
| 8,991,185 | B2* | 3/2015 | Huber | F23R 3/002 60/725 |
| 2002/0152740 | A1* | 10/2002 | Suenaga | F23R 3/045 60/39.23 |
| 2005/0034918 | A1* | 2/2005 | Bland | F23M 20/005 181/250 |
| 2005/0223707 | A1* | 10/2005 | Ikeda | F23R 3/04 60/725 |
| 2005/0229581 | A1* | 10/2005 | Bellucci | F23D 11/402 60/39.17 |
| 2007/0169992 | A1* | 7/2007 | Wasif | F23M 20/005 181/293 |
| 2011/0220433 | A1* | 9/2011 | Nakamura | F01D 9/023 181/213 |
| 2013/0074501 | A1* | 3/2013 | Tiwary | F23M 5/00 60/725 |
| 2013/0206500 | A1* | 8/2013 | Ono | F02C 7/24 181/213 |
| 2015/0020498 | A1* | 1/2015 | Schilp | F23R 3/002 60/39.83 |

FOREIGN PATENT DOCUMENTS

| | | |
|---|---|---|
| JP | 2009-235970 | 10/2009 |
| JP | 2014-206350 | 10/2014 |
| JP | 2014-238099 | 12/2014 |
| KR | 10-2011-0046543 | 5/2011 |
| WO | 2010/097982 | 9/2010 |

OTHER PUBLICATIONS

Written Opinion of the International Searching Authority dated Apr. 7, 2015 in International (PCT) Application No. PCT/JP2015/055073, with English Translation.
Letter of Notice of Examiner's Opinions dated Feb. 22, 2016 in Taiwanese Application No. 104106057, with English Translation.
Office Action dated Jul. 11, 2017 in Japanese Application No. 2014-007076, with English Translation.
Korean Office Action dated Dec. 26, 2018 in corresponding Korean Patent Application No. 10-2017-7023026 with English translation.
Korean Office Action dated Jun. 13, 2019 in corresponding Korean Patent Application 10-2017-7023026 with English translation.
Chinese Office Action dated Oct. 19, 2018 in corresponding Chinese Patent Application No. 201580075590.7 with English Translation.

* cited by examiner

DAMPING DEVICE, COMBUSTOR, AND GAS TURBINE

FIELD

The present invention relates to a damping device for damping combustion vibration generated at the time of combustion, a combustor, and a gas turbine.

BACKGROUND

Conventionally, there has been known a combustor provided with a damping device including an acoustic liner and an acoustic damper (see, for example, Patent Literature 1). In this damping device, the acoustic liner includes a cylindrical plate portion and a liner cover provided on an outer peripheral side of the plate portion. The acoustic damper includes a damper cover provided on an outer peripheral side of the liner cover and an opening formed in the liner cover. A space formed between the plate portion and the liner cover is separated by a first divider and a second divider. A space spanning over one thirds of an upper whole circumference becomes a first acoustic-damper resonant space, and a space spanning over two third of a lower whole circumference becomes a second acoustic-liner resonant space. A space formed between the liner cover and the damper cover becomes a second acoustic-damper resonant space. The second acoustic-damper resonant space communicates with the first acoustic-damper resonant space via the opening, to work as an integral acoustic damper.

CITATION LIST

Patent Literature

Patent Literature 1: International Publication No. WO2010/097982 A

SUMMARY

Technical Problem

In the combustor of Patent Literature 1, the opening causes the first acoustic-damper resonant space and the second acoustic-damper resonant space to communicate with each other, thereby forming an integral acoustic damper. The acoustic-liner resonant space is divided by the first acoustic-damper resonant space in a circumferential direction. If the acoustic-liner resonant space is divided in the circumferential direction, in a divided portion, it is difficult to suppress combustion vibration by the acoustic liner. Therefore, while the acoustic damper can suppress vibration, vibration suppression performance by the acoustic liner decreases due to the presence of the portion to be divided.

Therefore, an object of the present invention is to provide a damping device, a combustor, and a gas turbine that can improve vibration suppression performance by an acoustic liner, while maintaining the vibration suppression performance by an acoustic damper.

Solution to Problem

A damping device according to the present invention includes an acoustic liner that forms an acoustic-liner resonant space along an outer periphery of an internal flow path in which a fluid flows, and an acoustic damper provided on an outer peripheral side of the acoustic liner, to form an acoustic-damper resonant space that communicates with the acoustic-liner resonant space. The acoustic liner includes a divided portion that is a portion to be divided in a direction along an outer periphery of the internal flow path, by a damper opening connected with the acoustic damper for causing the acoustic-liner resonant space and the acoustic-damper resonant space to communicate with each other, and a continuous portion that is a portion continuous over the direction along the outer periphery of the internal flow path.

According to this configuration, the damper opening can be formed, while providing the continuous portion in the acoustic liner. Therefore, in the divided portion of the acoustic liner, the damper opening can cause the acoustic-liner resonant space and the acoustic-damper resonant space to communicate with each other, thereby enabling to damp vibration by a fluid circulating in the internal flow path by the acoustic damper. Further, because the acoustic liner is not divided in the direction along the outer periphery of the internal flow path due to the continuous portion of the acoustic liner, the acoustic-liner resonant space can be formed in the continuous portion of the acoustic liner over the direction along the outer periphery of the internal flow path. Therefore, because the acoustic liner is not divided, the vibration due to the fluid circulating in the internal flow path can be favorably damped by the acoustic liner. Accordingly, vibration suppression performance of the acoustic liner can be improved, while maintaining the vibration suppression performance of the acoustic damper. The damper opening can be in any shape of rectangular, circular, and elliptical shapes, and is not particularly limited.

Further, it is preferable that the acoustic liner is formed in a cylindrical shape, with the direction along the outer periphery of the internal flow path being a circumferential direction, and an axial direction orthogonal to the circumferential direction being a width direction, and the damper opening is formed to be closer to one side in the width direction.

According to this configuration, the damper opening can be formed to the one side in the width direction of the acoustic liner. Therefore, the divided portion can be provided on the one side in the width direction of the acoustic liner, and the continuous portion can be provided on the other side in the width direction of the acoustic liner.

Further, it is preferable that the acoustic liner is formed in a cylindrical shape, with the direction along the outer periphery of the internal flow path being a circumferential direction, and an axial direction orthogonal to the circumferential direction being a width direction, and the damper opening is formed at a center in the width direction.

According to this configuration, the damper opening can be formed at the center in the width direction of the acoustic liner. Therefore, the divided portion can be provided at the center in the width direction of the acoustic liner, and the continuous portion can be provided on both sides in the width direction of the acoustic liner.

Further, it is preferable that the damper opening is formed to be a rectangular opening.

According to this configuration, by forming the damper opening in a rectangular shape, the damper opening can be formed easily.

A combustor according to the present invention includes the above-described damping device, and a transition piece in which the internal flow path is formed therein.

According to this configuration, combustion vibration generated by a combustion gas as a fluid circulating inside the transition piece of the combustor can be favorably damped by the damping device. That is, by providing the acoustic liner connected with the acoustic damper along the outer periphery of the transition piece of the combustor, combustion vibration near the flame of the combustor can be damped by the acoustic liner and the acoustic damper. Accordingly, the combustion vibration can be damped more effectively.

A gas turbine according to the present invention includes the above-described combustor, and a turbine rotated by a combustion gas generated in the combustor.

According to this configuration, by using the combustor that realizes suppression of combustion vibration, a load due to the combustion vibration can be suppressed, thereby enabling to improve the service life.

DESCRIPTION OF EMBODIMENTS

Exemplary embodiments of the present invention will be explained below in detail with reference to the accompanying drawings. The present invention is not limited to the embodiments. In addition, constituent elements in the embodiments include elements replaceable and easily made by those skilled in the art, or substantially the same elements. Further, the constituent elements described below can be suitably combined with each other, and when there are a plurality of embodiments, the respective embodiments can also be combined with each other.

First Embodiment

Figure 1:
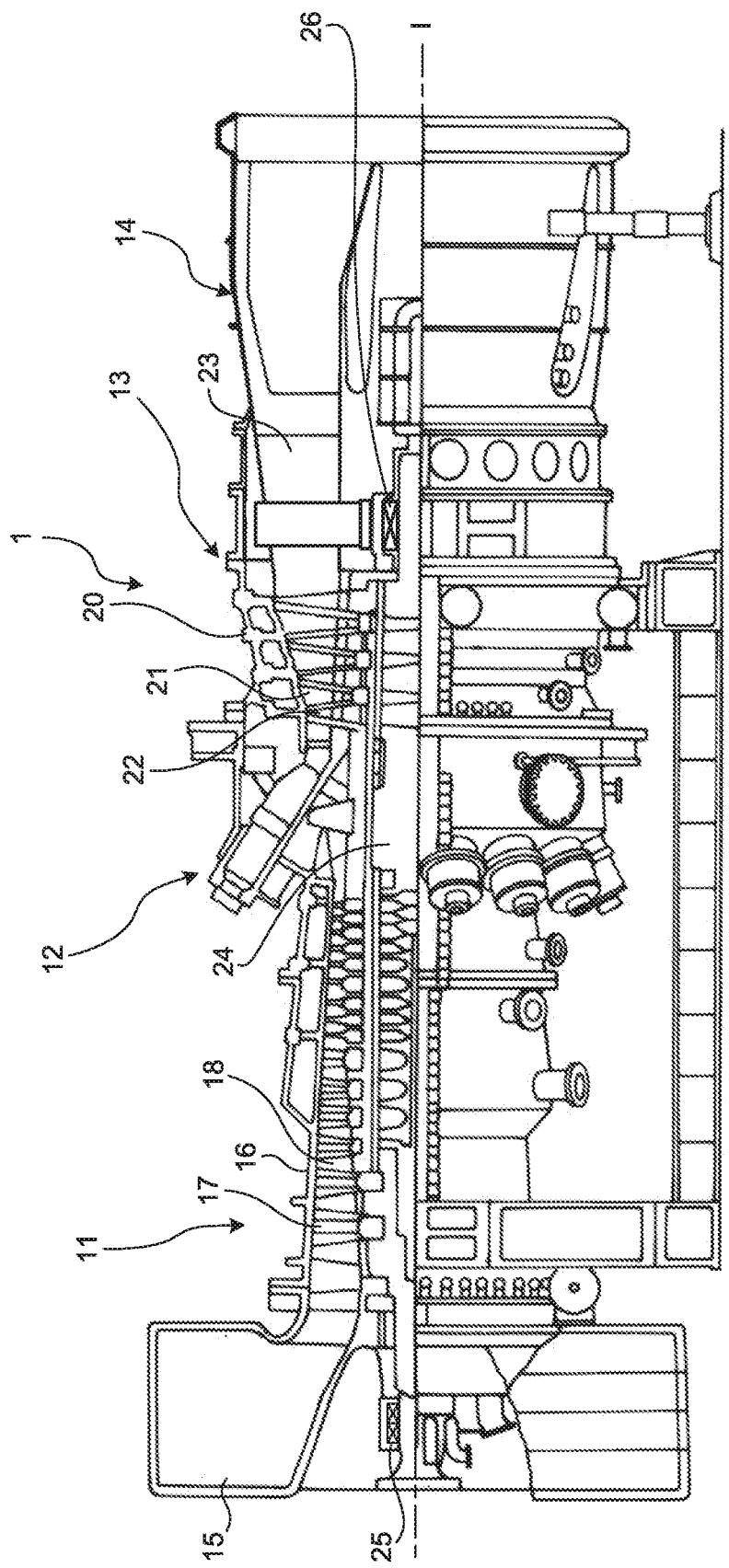
FIG. 1 is a schematic configuration diagram of a gas turbine according to a first embodiment.
Figure 2:
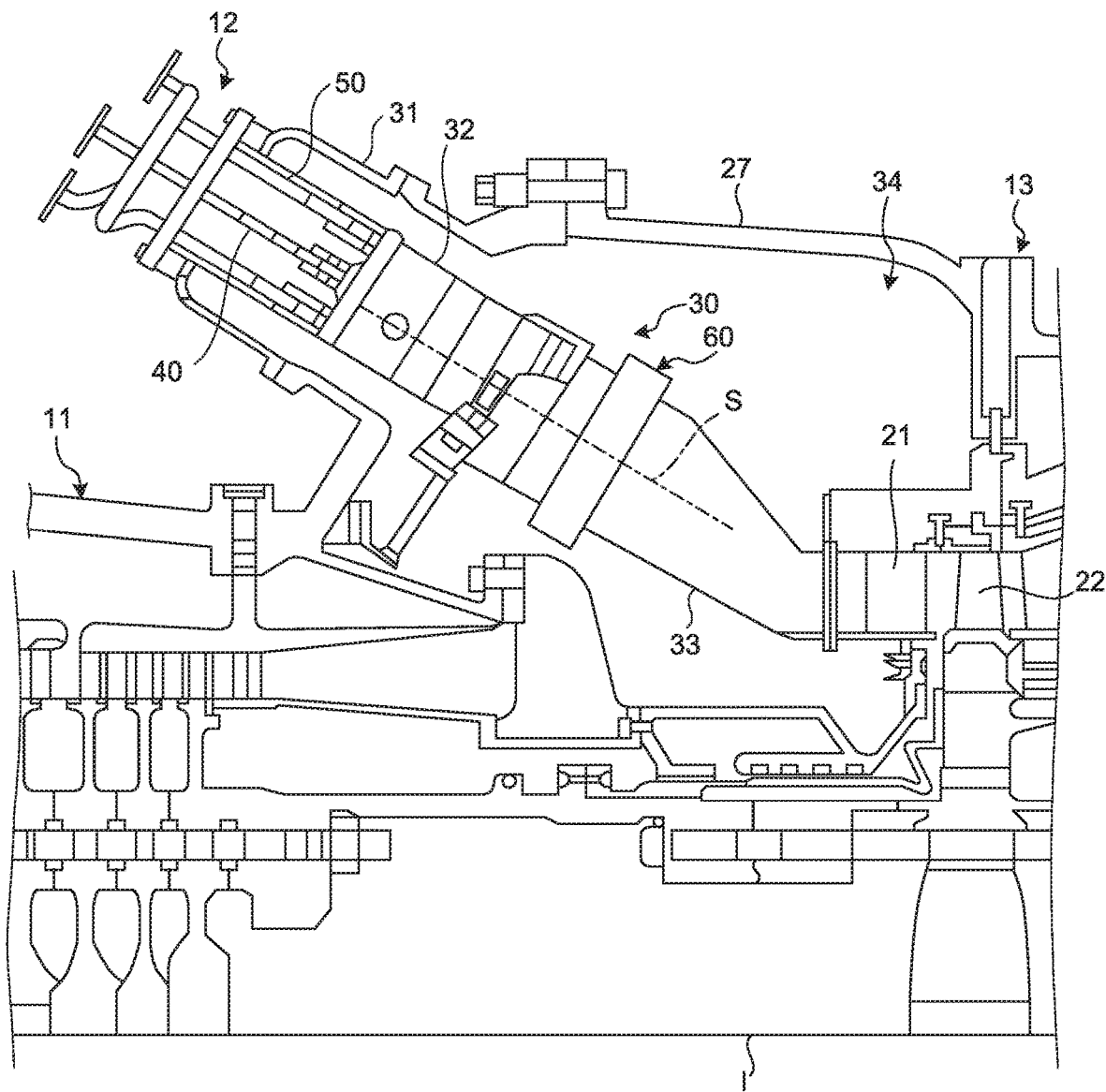
FIG. 2 is an enlarged view in a combustor of the gas turbine in FIG. 1.
Figure 3:
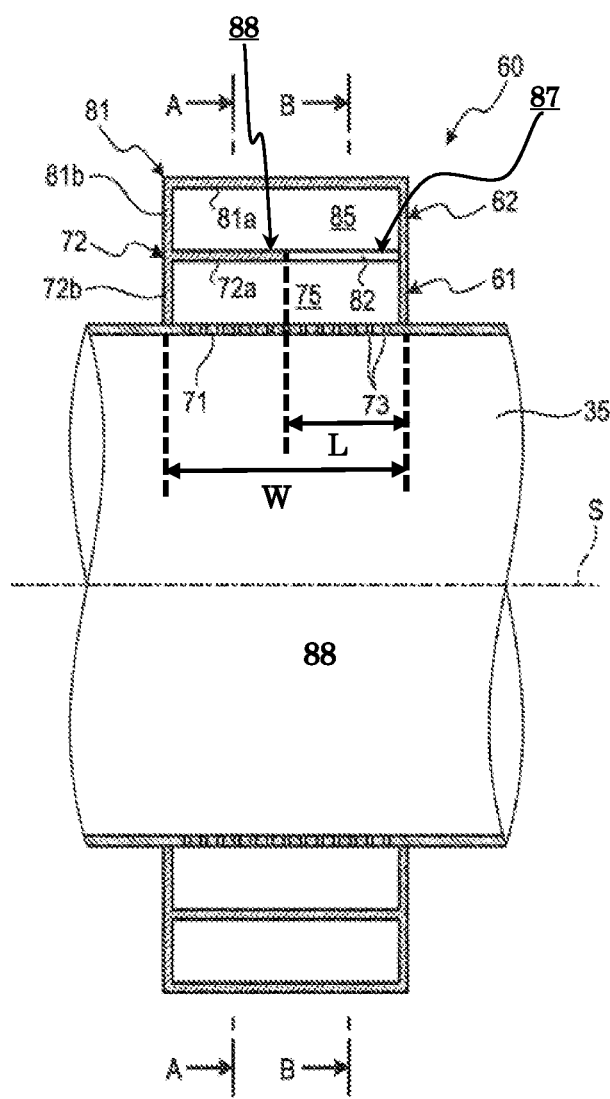
FIG. 3 is a sectional view when a damping device according to the first embodiment is cut along an axial direction.
Figure 4:
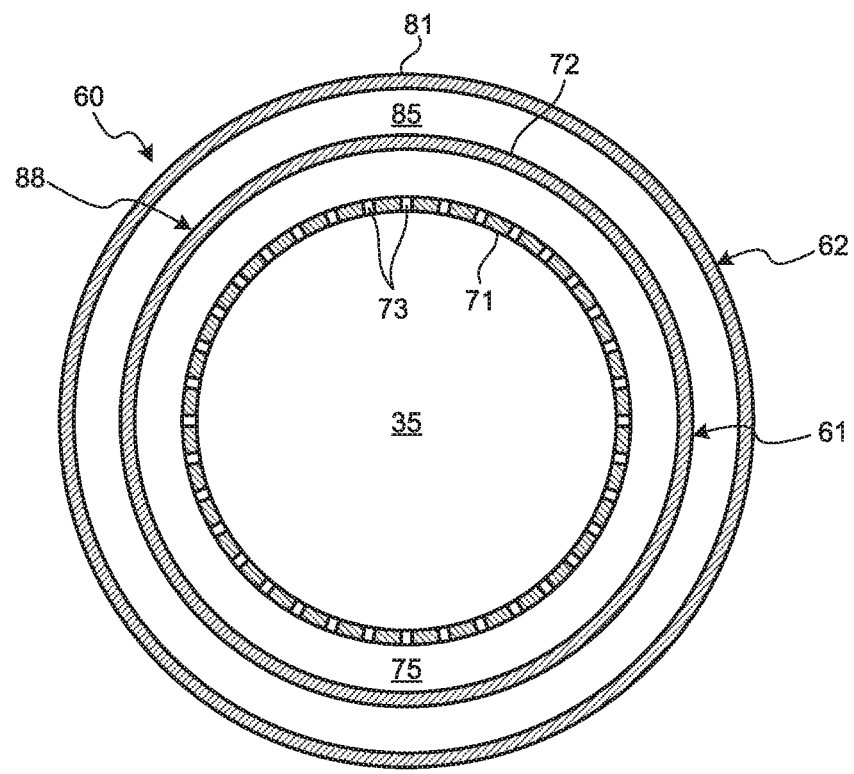
FIG. 4 is a sectional view along a line A-A in FIG. 3.
Figure 5:
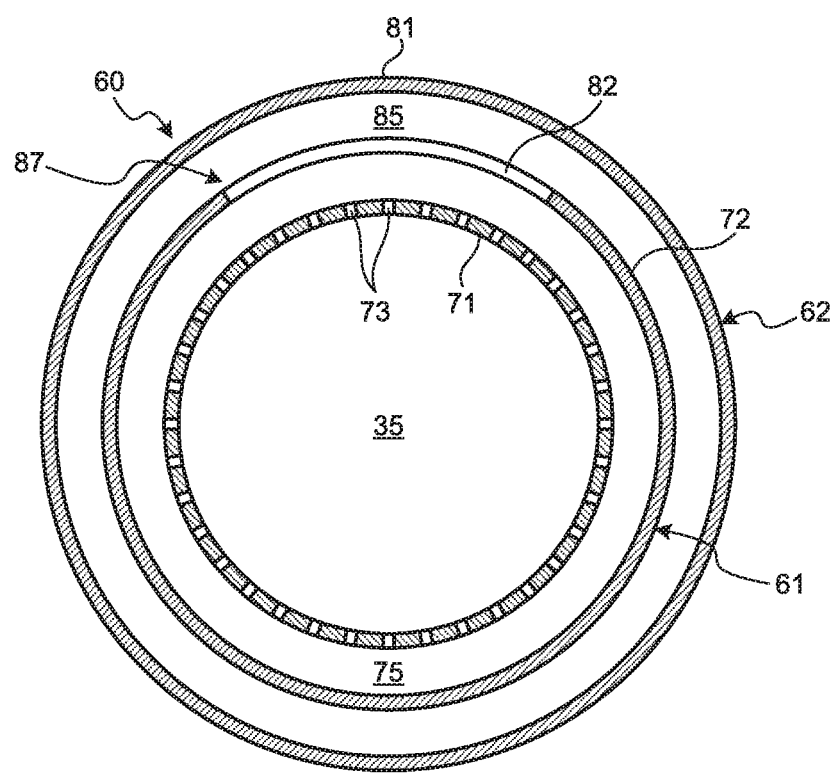
FIG. 5 is a sectional view along a line B-B in FIG. 3.
Figure 6:
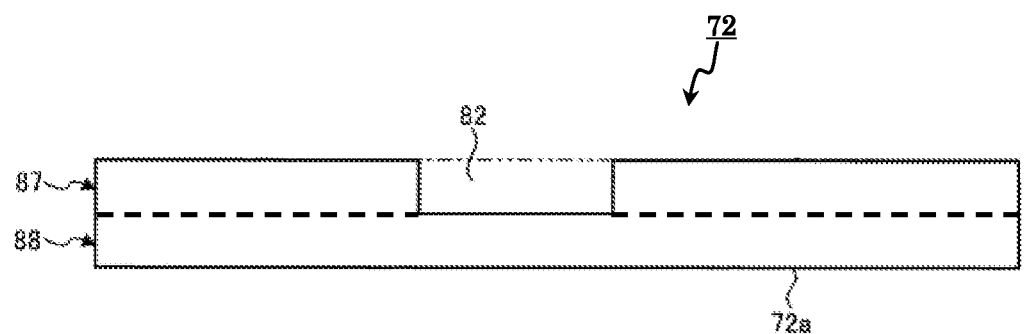
FIG. 6 is an expansion plan when an acoustic liner according to the first embodiment is expanded in a circumferential direction.
Figure 7:
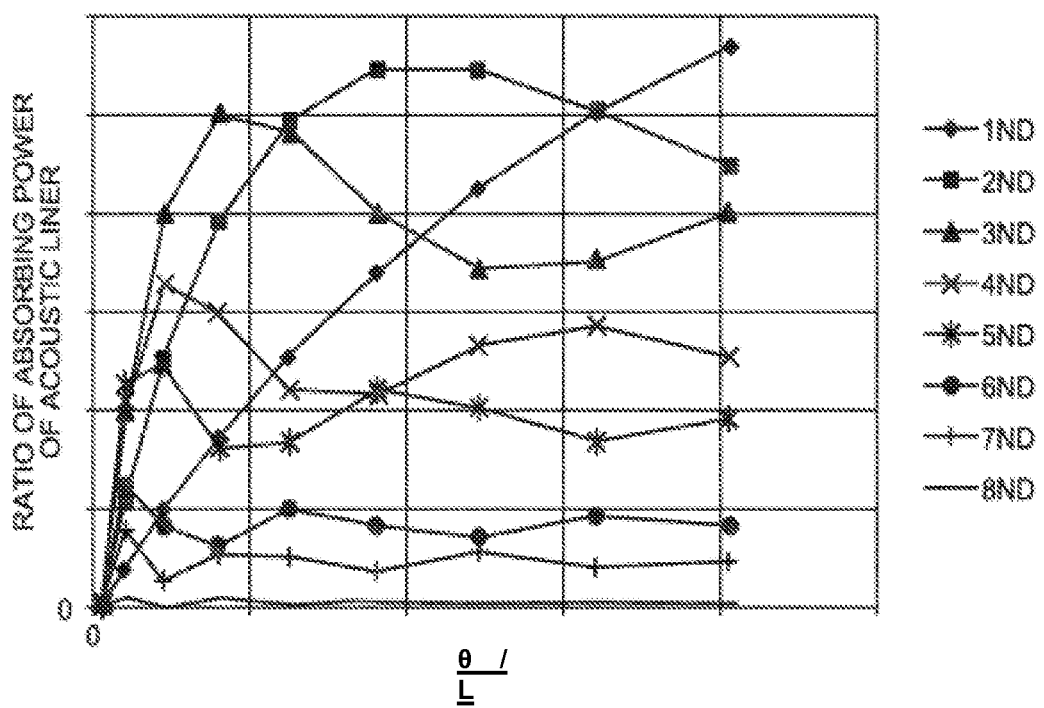
FIG. 7 is a graph relating to performance of an absorbing power of the acoustic liner according to the first embodiment.

FIG. 1 is a schematic configuration diagram of a gas turbine according to a first embodiment. FIG. 2 is an enlarged view in a combustor of the gas turbine in FIG. 1. FIG. 3 is a sectional view when a damping device according to the first embodiment is cut along an axial direction. FIG. 4 is a sectional view along a line A-A in FIG. 3. FIG. 5 is a sectional view along a line B-B in FIG. 3. FIG. 6 is an expansion plan when an acoustic liner according to the first embodiment is expanded in a circumferential direction. FIG. 7 is a graph relating to performance of an absorbing power of the acoustic liner according to the first embodiment.

As illustrated in FIG. 1, a gas turbine 1 includes a compressor 11, a combustor 12, a turbine 13, and an exhaust chamber 14, and a power generator (not illustrated) is coupled to the side of the compressor 11.

The compressor 11 includes an air inlet 15 to take in air, and a plurality of turbine vanes 17 and a plurality of turbine blades 18 are alternately arranged in a compressor cylinder 16. The combustor 12 supplies fuel to compressed air compressed by the compressor 11 and ignites a resultant air-fuel mixture by a burner, thereby enabling to burn the fuel. In the turbine 13, a plurality of turbine vanes 21 and a plurality of turbine blades 22 are alternately arranged in a turbine cylinder 20. The exhaust chamber 14 includes an exhaust diffuser 23 continuous to the turbine 13. A rotor 24 is placed to pass through central parts of the compressor 11, the combustor 12, the turbine 13, and the exhaust chamber 14. While an end on the side of the compressor 11 is rotatably supported by a bearing 25, an end on the side of the exhaust chamber 14 is rotatably supported by a bearing 26. A plurality of disk plates are fixed to the rotor 24, the respective turbine blades 18 and 22 are coupled thereto, and a drive shaft of the power generator (not illustrated) is coupled to the end on the side of the compressor 11.

Accordingly, air taken in from the air inlet 15 of the compressor 11 is compressed while passing through the turbine vanes 21 and the turbine blades 22 to become high-temperature and high-pressure compressed air, and predetermined fuel is supplied to the compressed air in the combustor 12 to burn. A high-temperature and high-pressure combustion gas being a working fluid generated by the combustor 12 drives and rotates the rotor 24 by passing through the turbine vanes 21 and the turbine blades 22 that constitute the turbine 13, to drive the power generator coupled to the rotor 24. On the other hand, a flue gas being a combustion gas after having driven and rotated the rotor 24 is converted to static pressure by the exhaust diffuser 23 in the exhaust chamber 14, and is discharged to the atmosphere.

FIG. 2 is an enlarged view of the combustor in FIG. 1. The combustor 12 includes a combustor casing 30. The combustor casing 30 includes an inner cylinder 32 arranged inside an external cylinder 31, and a transition piece 33 coupled to the tip of the inner cylinder 32, and extends along a central axis S inclined with respect to a rotation axis I of the rotor 24.

The external cylinder 31 is fastened to a cylinder housing 27 that forms a cylinder 34 into which the compressed air from the compressor 11 flows. A base end of the inner cylinder 32 is supported by the external cylinder 31, and the inner cylinder 32 is arranged inside of the external cylinder 31 with a predetermined gap from the external cylinder 31. A pilot burner 40 is arranged in the central part of the inner cylinder 32 along the central axis S. A plurality of main burners 50 are arranged around the pilot burner 40 parallel thereto with an equal interval to surround the pilot burner 40. A base end of the transition piece 33 is formed in a cylindrical shape and is coupled to the tip of the inner cylinder 32. The transition piece 33 is formed in a curved shape in such a manner that a sectional area decreases toward the tip side, and is opened toward the turbine vane 21 on the first stage of the turbine 13. The transition piece 33 constitutes a combustion chamber 35 therein. A damping device 60 that damps combustion vibration generated in the transition piece 33 is provided in the transition piece 33.

As is illustrated in FIG. 3 to FIG. 5, the damping device 60 includes an acoustic liner 61 provided on an inner peripheral side thereof and an acoustic damper 62 provided on an outer peripheral side thereof. The acoustic liner 61 is provided to absorb high-frequency vibration generated due to combustion vibration, and the acoustic damper 62 is provided to absorb low-frequency vibration generated due to the combustion vibration.

The acoustic liner 61 is provided over the whole circumference in the circumferential direction along the outer periphery of the transition piece 33 having a cylindrical shape. The acoustic liner 61 is configured to include a perforated plate 71 in which a plurality of sound absorbing holes 73 are formed, and a liner cover 72 provided around the perforated plate 71. The perforated plate 71 is a part of the transition piece 33, and is formed in a cylindrical shape, with the inside thereof being the combustion chamber (internal flow path) 35 described above. The liner cover 72 includes a cylindrical portion 72a having a cylindrical shape provided on the outer peripheral side of the perforated plate 71, and a pair of side plates 72b provided on both sides in the axial direction of the central axis S of the cylindrical portion 72a, and is provided to cover the perforated plate 71. Accordingly, an acoustic-liner resonant space 75 is formed over the whole circumference between the perforated plate 71 and the liner cover 72. The acoustic-liner resonant space 75 is blocked from an external space by the liner cover 72.

The acoustic damper 62 is provided over the whole circumference in the circumferential direction along the outer periphery of the acoustic liner 61. The acoustic damper 62 is configured to include a damper cover 81 provided around the acoustic liner 61, and a damper opening 82 formed in the cylindrical portion 72a of the liner cover 72.

The damper cover 81 includes a cylindrical portion 81a having a cylindrical shape provided on the outer peripheral side of the acoustic liner 61, and a pair of side plates 81b provided on both sides in the axial direction of the central axis S of the cylindrical portion 81a, and is provided to cover the cylindrical portion 72a of the acoustic liner 61. Accordingly, an acoustic-damper resonant space 85 is formed over the whole circumference between the cylindrical portion 72a of the acoustic liner 61 and the damper cover 81. The acoustic-damper resonant space 85 is blocked from an external space by the damper cover 81.

The damper opening 82 is an opening that causes the acoustic-liner resonant space 75 of the acoustic liner 61 and the acoustic-damper resonant space 85 of the acoustic damper 62 to communicate with each other. If the axial direction of the central axis S is designated as the width direction, the damper opening 82 is formed to be closer to one side in the width direction with respect to the cylindrical portion 72a of the liner cover 72 expanded in the circumferential direction, and is a rectangular opening, as illustrated in FIG. 6.

In the acoustic liner 61 formed with the damper opening 82 described above, a divided portion 87 divided in the circumferential direction by the damper opening 82 and a continuous portion 88 that is continuous over the circumferential direction are formed in the cylindrical portion 72a of the liner cover 72. Therefore, as illustrated in FIG. 4, the acoustic-liner resonant space 75 is formed over the whole circumference in the continuous portion 88, and as illustrated in FIG. 5, is formed by being divided in the circumferential direction in the divided portion 87. The continuous portion 88 is provided on one side in the width direction of the liner cover 72, and the divided portion 87 is provided on the other side in the width direction of the liner cover 72.

In the damping device 60 formed as described above, when combustion vibration is generated by the fuel burning in the combustion chamber 35, the combustion vibration is transmitted from the combustion chamber 35 to the acoustic-liner resonant space 75 via the sound absorbing holes 73 in the perforated plate 71. Of the combustion vibration transmitted into the acoustic-liner resonant space 75, high-frequency combustion vibration is damped in the acoustic-liner resonant space 75.

The acoustic-liner resonant space 75 communicates with the acoustic-damper resonant space 85 via the damper opening 82. Therefore, the combustion vibration generated in the combustion chamber 35 is transmitted to the acoustic-damper resonant space 85 via the acoustic-liner resonant space 75. Of the combustion vibration transmitted to the acoustic-damper resonant space 85, combustion vibration having a low frequency is damped in the acoustic-damper resonant space 85.

Damping performance (absorbing power) by the acoustic liner 61 of the first embodiment is described next with reference to FIG. 7. In a graph in FIG. 7, a conventional ratio of the absorbing power of the acoustic liner 61 is plotted on a longitudinal axis, and a ratio ($\theta$/L) of the damper opening 82 is plotted on a horizontal axis. The absorbing power of the acoustic liner 61 is derived by an analysis using a predetermined calculation method. In a conventional acoustic liner, the damper opening 82 is formed over the whole width of the cylindrical portion 72a of the liner cover 72. At this time, the damper opening 82 of the first embodiment and a conventional damper opening have the same opening area. If a length of the damper opening 82 in the width direction is designated as L, and a length of the damper opening 82 in the circumferential direction as $\theta$, the aspect ratio of the damper opening 82 is represented by L/$\theta$.

The absorbing power of the acoustic liner 61 is analyzed over a plurality of acoustic modes. The acoustic mode is represented by nodal diameters (ND), and the nodal diameters indicate the number of sinusoidal waves generated in the circumferential direction of the combustion chamber 35. That is, 1 ND indicates an acoustic mode in which the sinusoidal wave is generated only for one wave in the circumferential direction of the combustion chamber 35. Similarly, 2 to 8 ND indicate an acoustic mode in which the sinusoidal wave is generated for two to eight waves, respectively, in the circumferential direction of the combustion chamber 35. The absorbing power of the acoustic liner 61 is analyzed over 360 degrees, while changing a phase of the sinusoidal waves generated along the circumferential direction of the combustion chamber 35 by predetermined phases.

As illustrated in FIG. 7, as a result of analysis, it has been confirmed that the absorbing power of the acoustic liner 61 becomes positive as compared to the conventional case. That is, because the opening area as the damper opening 82 has the same opening area of the conventional damper opening, it has been confirmed that vibration damping performance by the acoustic liner 61 is improved, while maintaining the vibration damping performance by the acoustic damper 62.

As described above, according to the first embodiment, the damper opening 82 can be formed while providing the continuous portion 88 in the acoustic liner 61. Therefore, in the divided portion 87 of the acoustic liner 61, the acoustic-liner resonant space 75 and the acoustic-damper resonant space 85 can communicate with each other by the damper opening 82. Therefore, combustion vibration generated in the combustion chamber 35 can be damped by the acoustic damper 62. Further, because the acoustic-liner resonant space 75 in the acoustic liner 61 is not divided in the circumferential direction because of the continuous portion 88 of the acoustic liner 61, the acoustic-liner resonant space 75 can be formed over the circumferential direction in the continuous portion 88 of the acoustic liner 61. Therefore, because the acoustic-liner resonant space 75 in the acoustic liner 61 is not divided, combustion vibration in the combustion chamber 35 can be favorably damped by the acoustic liner 61. Accordingly, vibration suppression performance by the acoustic liner 61 can be improved, while maintaining the vibration suppression performance by the acoustic damper 62.

Further, according to the first embodiment, the damper opening 82 can be formed to be closer to one side in the width direction of the acoustic liner 61. Therefore, the divided portion 87 can be provided on the one side in the width direction of the acoustic liner 61, and the continuous portion 88 can be provided on the other side in the width direction of the acoustic liner 61.

According to the first embodiment, by forming the damper opening 82 in a rectangular shape, the damper opening 82 can be easily formed by machining.

According to the first embodiment, combustion vibration generated by a combustion gas (fluid) circulating inside the transition piece 33 of the combustor 12 can be favorably damped by the damping device 60. That is, by providing the acoustic liner 61 connected with the acoustic damper 62 along the outer periphery of the transition piece 33 of the combustor 12, combustion vibration near the flame of the combustor 12 can be damped by the acoustic liner 61 and the acoustic damper 62. Accordingly, the combustion vibration can be damped more effectively.

According to the first embodiment, by using the combustor 12 that realizes suppression of combustion vibration, a load due to the combustion vibration can be suppressed, thereby enabling to improve the service life of the gas turbine 1.

In the first embodiment, while the damper opening 82 has a rectangular shape, the shape thereof is not limited to the rectangular shape, and can be in any shape such as a circular shape and an elliptical shape.

Second Embodiment

Figure 8:
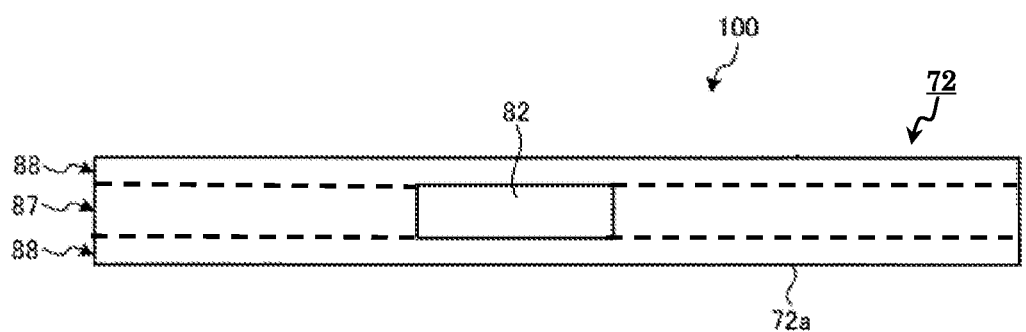
FIG. 8 is an expansion plan when an acoustic liner according to a second embodiment is expanded in a circumferential direction.

A damping device 100 according to a second embodiment is described with reference to FIG. 8. FIG. 8 is an expansion plan when an acoustic liner according to the second embodiment is expanded in a circumferential direction. In the second embodiment, in order to avoid redundant descriptions, portions different from the first embodiment are described, and parts having identical configurations as those of the first embodiment are denoted by like reference signs. In the damping device 60 according to the first embodiment, the damper opening 82 is formed to be closer to one side in the width direction with respect to the cylindrical portion 72a of the liner cover 72. However, in the damping device 100 according to the second embodiment, the damper opening 82 is formed at the center in the width direction with respect to the cylindrical portion 72a of the liner cover 72.

As illustrated in FIG. 8, in the damping device 100 according to the second embodiment, because the damper opening 82 is formed at the center in the width direction of the cylindrical portion 72a of the liner cover 72, the divided portion 87 is formed at the center in the width direction. Further, the continuous portion 88 is provided in a pair on both sides in the width direction, having the divided portion 87 therebetween.

As described above, according to the second embodiment, the damper opening 82 can be formed at the center in the width direction of the acoustic liner 61. Therefore, the divided portion 87 can be provided at the center in the width direction of the acoustic liner 61, and the continuous portion 88 can be provided in a pair on the both sides in the width direction of the acoustic liner 61.

REFERENCE SIGNS LIST 1 gas turbine
11 compressor
12 combustor
13 turbine
24 rotor
30 combustor casing
31 external cylinder
32 inner cylinder
33 transition piece
34 cylinder
35 combustion chamber
60 damping device
61 acoustic liner
62 acoustic damper
71 perforated plate
72 liner cover
75 acoustic-liner resonant space
81 damper cover
82 damper opening
85 acoustic-damper resonant space
87 divided portion
88 continuous portion

The invention claimed is:

1. A damping device comprising:
an acoustic liner that forms an acoustic-liner resonant space along an outer periphery of an internal flow path in which a fluid flows, the acoustic-linear resonant space being formed over a whole circumference in a circumferential direction; and
an acoustic damper, provided on an outer peripheral side of the acoustic liner, to form an acoustic-damper resonant space that communicates with the acoustic-liner resonant space, the acoustic-damper resonant space being formed over a whole circumference in a circumferential direction,
wherein the acoustic damper has a same width as the acoustic liner in an axial direction, and is stacked on an outer periphery of the acoustic liner, and
the acoustic liner includes:
a divided portion that is a portion divided in a direction along an outer periphery of the internal flow path, by a single damper opening connected with the acoustic damper for causing the acoustic-liner resonant space and the acoustic-damper resonant space to communicate with each other,
a continuous portion that is a portion continuous over the direction along the outer periphery of the internal flow path,
wherein the damper opening is formed as a rectangular opening,
wherein a width of the damper opening is L, a length of the damper opening in the circumferential direction is θ, and the width of the acoustic liner is W, and the width L is less than the width W, and
an area defined by the damper opening is constant for all values of L and an aspect ratio of the damper opening is defined by L/θ.

2. The damping device according to claim 1, wherein
the acoustic liner is formed in a cylindrical shape, with the direction along the outer periphery of the internal flow path being a circumferential direction, and the axial direction orthogonal to the circumferential direction being a width direction, and the damper opening is formed to be closer to one side of the acoustic liner in the width direction.

3. The damping device according to claim 1, wherein the acoustic liner is formed in a cylindrical shape, with the direction along the outer periphery of the internal flow path being a circumferential direction, and the axial direction orthogonal to the circumferential direction being a width direction, and the damper opening is formed at a center of the acoustic liner in the width direction.

4. A combustor comprising:

the damping device according to claim 1; and a transition piece in which the internal flow path is formed therein.

5. A gas turbine comprising:

the combustor according to claim 4; and a turbine rotated by a combustion gas generated in the combustor.

6. A damping device comprising:

an acoustic liner that forms an acoustic-liner resonant space along an outer periphery of an internal flow path in which a fluid flows, the acoustic-linear resonant space being formed over a whole circumference in a circumferential direction; and an acoustic damper, provided on an outer peripheral side of the acoustic liner, to form an acoustic-damper resonant space that communicates with the acoustic-liner resonant space, the acoustic-damper resonant space being formed over a whole circumference in a circumferential direction, wherein the acoustic damper has a same width as the acoustic liner in an axial direction, and is stacked on an outer periphery of the acoustic liner, and the acoustic liner includes:

a cylindrical perforated plate having a plurality of through holes;

a cylindrical liner cover provided on an outer side of the perforated plate so as to cover the perforated plate; and a pair of side plates on first and second sides in the axial direction of the liner cover, respectively, wherein the liner cover delimits the acoustic-liner resonant space and the acoustic-damper resonant space, and the liner cover includes a single rectangular damper opening having width that is less than a width of the liner cover in the axial direction, wherein the damper opening is formed as a rectangular opening, wherein the width of the damper opening is L, a length of the damper opening in the circumferential direction is θ, and the width of the acoustic liner is W, and an area defined by the damper opening is constant for all values of L and an aspect ratio of the damper opening is defined by L/θ, and absorbing power of the acoustic liner increases with an increase in the aspect ratio of the damper opening.

7. The damping device according to claim 6, wherein the damper opening is formed in one of the first and second ends of the liner cover.

8. The damping device according to claim 6, wherein the damper opening is formed in one of the first and second ends of the liner cover.

\* \* \* \* \*